US012702956B2

(12) United States Patent
Kozawa

(10) Patent No.: US 12,702,956 B2
(45) Date of Patent: Aug. 11, 2026

(54) COLLECTING FILTER AND METHOD FOR MANUFACTURING TRANSPARENT CONDUCTING FILM USING THE SAME

(71) Applicant: DENSO CORPORATION, Kariya-city (JP)

(72) Inventor: Yoshihiro Kozawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 93 days.

(21) Appl. No.: 18/775,512

(22) Filed: Jul. 17, 2024

(65) Prior Publication Data

US 2024/0399315 A1 Dec. 5, 2024

Related U.S. Application Data

(63) Continuation of application No. PCT/JP2023/001322, filed on Jan. 18, 2023.

(30) Foreign Application Priority Data

Jan. 24, 2022 (JP) ................................ 2022-008845

(51) Int. Cl.
*B01D 69/02* (2006.01)
*B01D 69/06* (2006.01)

(52) U.S. Cl.
CPC ............ *B01D 69/02* (2013.01); *B01D 69/06* (2013.01); *B01D 2325/0214* (2022.08); *B01D 2325/0231* (2022.08); *B01D 2325/0233* (2022.08); *B01D 2325/0283* (2022.08); *B01D 2325/04* (2013.01); *B01D 2325/08* (2013.01)

(58) Field of Classification Search
CPC .................... B01D 69/02; B01D 69/06; B01D 2325/0214; B01D 2325/0231; B01D 2325/0233; B01D 2325/0283; B01D 2325/04; B01D 2325/08; B01D 39/16; B01D 39/20; C01B 32/168; H01B 13/00
See application file for complete search history.

(56) References Cited

U.S. PATENT DOCUMENTS

| | | | |
|---|---|---|---|
| 4,983,288 A | 1/1991 | Karbachsch et al. | |
| 5,096,633 A | 3/1992 | Yoshida | |
| 5,147,740 A | 9/1992 | Robinson | |
| 2015/0068787 A1* | 3/2015 | Chung | H05K 3/1258 174/250 |
| 2021/0360745 A1 | 11/2021 | Naruse et al. | |

FOREIGN PATENT DOCUMENTS

| | | | |
|---|---|---|---|
| CN | 204768299 U | 11/2015 | |
| DE | 3818860 A1 | 12/1989 | |
| JP | 2009031373 A | 2/2009 | |
| JP | 2014044839 A | 3/2014 | |
| JP | 2020119744 A | 8/2020 | |
| KR | 20170075565 A * | 7/2017 | G06F 3/041 |
| KR | 102096293 B1 * | 4/2020 | H01L 41/047 |

* cited by examiner

*Primary Examiner* — Christopher W Raimund
(74) *Attorney, Agent, or Firm* — Harness, Dickey & Pierce, P.L.C.

(57) ABSTRACT

A collecting filter has a filter membrane with a porous structure to filter a nanocarbon material from a dispersion medium containing the nanocarbon material, and a dense film having an opening through which the dispersion medium passes. The opening has a reverse tapered shape in which a first width at an inlet of the dispersion medium opposite to the filter membrane is smaller than a second width at a bottom side adjacent to the filter membrane.

6 Claims, 8 Drawing Sheets

| | SHEET RESISTANCE [Ω/□] |
|---|---|
| FORWARD TAPERED SHAPE | 150 |
| REVERSE TAPERED SHAPE | 120 |

COLLECTING FILTER AND METHOD FOR MANUFACTURING TRANSPARENT CONDUCTING FILM USING THE SAME

CROSS REFERENCE TO RELATED APPLICATIONS

The present application is a continuation application of International Patent Application No. PCT/JP2023/001322 filed on Jan. 18, 2023, which designated the U.S. and claims the benefit of priority from Japanese Patent Application No. 2022-8845 filed on Jan. 24, 2022. The entire disclosures of all of the above applications are incorporated herein by reference.

TECHNICAL FIELD

The present disclosure relates to a collecting filter of nanocarbon material such as carbon nanotubes (hereinafter referred to as CNTs) and a method for manufacturing a transparent conducting film using the same.

BACKGROUND

Conventionally, in order to realize high transmittance and low resistance, a transparent conducting film has a CNTs pattern formed on a transparent base material. The CNTs are collected by filtering a dispersion medium using CNTs aerosol or dispersion liquid, and then a transparent conducting film is manufactured by transferring the collected CNTs to a transparent substrate.

SUMMARY

According to one aspect of the present disclosure, a collecting filter includes: a filter membrane having a porous structure to filter a nanocarbon material from a dispersion medium containing the nanocarbon material, the filter membrane having one surface; and a dense film formed on the one surface and having an opening through which the dispersion medium passes. The dense film has a denseness to block passage of the dispersion medium in a portion different from the opening. The opening has a first width at an inlet of the dispersion medium opposite to the filter membrane and a second width at a bottom side adjacent to the filter membrane, and the first width is smaller than the second width.

DETAILED DESCRIPTION

Figure 1A:
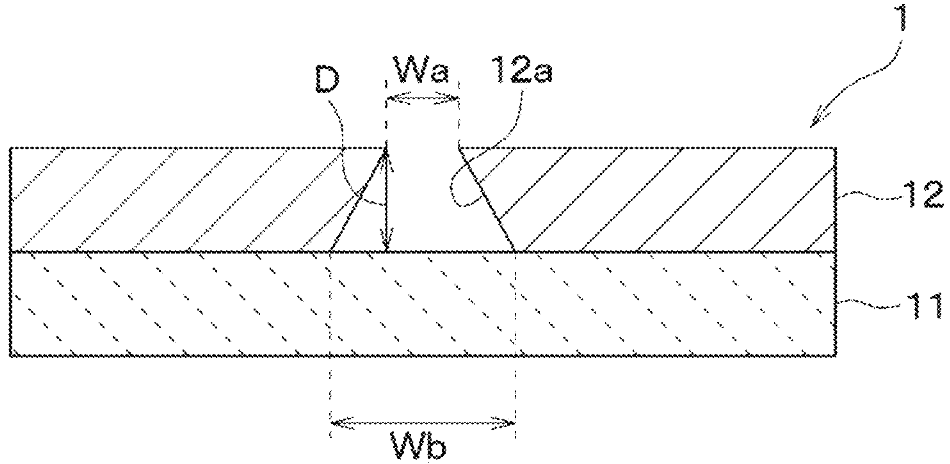
FIG. 1A is a schematic cross-sectional view of a collecting filter according to a first embodiment.

Conventionally, in order to realize high transmittance and low resistance in a transparent conducting film, a CNTs pattern is formed on a transparent base material. The CNTs are collected by filtering a dispersion medium using CNTs aerosol or dispersion liquid, and then a transparent conducting film is manufactured by transferring the collected CNTs to a transparent substrate.

As a result of intensive studies by the present inventor, it has been confirmed that it is not possible to reduce the resistance of CNTs simply by forming an opening for storing CNTs in the filter. Specifically, when an opening is simply formed in a filter by photolithography, the side wall of the opening is perpendicular to the filter surface, or the opening has a forward tapered shape in which the opening size is larger on the upstream side and smaller on the downstream side in the supply path of the dispersion medium. When the CNTs are collected using a filter with the opening having such a shape, the CNTs synthesis conditions change due to fluctuations in the internal pressure of the chamber in which the collection is performed. For this reason, the CNTs do not enter the opening accurately, and the quality of the CNTs becomes unstable and varies. In this case, it is difficult to reduce the resistance of the transparent conducting film.

The present disclosure provides a collecting filter to produce a low-resistance transparent conducting film, and a method for producing a transparent conducting film using the same.

According to one aspect of the present disclosure, a collecting filter includes: a filter membrane having a porous structure to filter a nanocarbon material from a dispersion medium containing the nanocarbon material, the filter membrane having one surface; and a dense film formed on the one surface and having an opening through which the dispersion medium passes. The dense film has a denseness to block passage of the dispersion medium in a portion different from the opening. The opening has a first width at an inlet of the dispersion medium opposite to the filter membrane and a second width at a bottom side adjacent to the filter membrane, and the first width is smaller than the second width.

In this way, in the collecting filter that includes the dense film with the opening on the one surface of the filter membrane, the opening has a reverse tapered shape in which the first width is smaller than the second width. By using such a collecting filter, it is possible to suppress fluctuations in the internal pressure of the chamber in which the nanocarbon material is collected, and it is possible to suppress changes in the synthesis conditions for the nanocarbon material. Therefore, it is possible to lower the resistance of the pattern made of nanocarbon material.

According to another aspect of the present disclosure, a method of manufacturing a transparent conducting film including a pattern made of a nanocarbon material using the collecting filter includes: arranging the collecting filter in a chamber where the dispersion medium containing the nanocarbon material is supplied, such that the dense film is oriented toward an upstream side of the dispersion medium in a supply path and the filter membrane is oriented toward a downstream side of the dispersion medium in the supply path; collecting the nanocarbon material within the opening by supplying the dispersion medium into the chamber and causing the dispersion medium to pass through the collecting filter; after collecting the nanocarbon material, placing a transparent base material on the dense film of the collecting filter; and removing the collecting filter from the transparent base material to transfer the nanocarbon material to the transparent base material so as to form the pattern using the nanocarbon material.

In this way, the nanocarbon material can be collected within the opening by using the collecting filter, in which the opening is formed in the dense film to have the reverse tapered shape, and by passing the dispersion medium through the collecting filter. At this time, the collected nanocarbon material and the dense film do not come into close contact with each other, and the contact area between the dense film and the nanocarbon material decreases. Therefore, even during the collection of the nanocarbon material, the dispersion medium can pass through a gap between the nanocarbon material and the dense film, and the pressure loss of the collecting filter is suppressed from increasing. Therefore, fluctuations in the internal pressure of the chamber used to collect the nanocarbon material can be suppressed, and the synthesis conditions for the nanocarbon material can be stabilized. Accordingly, the quality of the pattern made of the nanocarbon material can be stabilized and the resistance can be reduced.

Hereinafter, embodiments of the present disclosure will be described with reference to the drawings. In each embodiment described below, same or equivalent parts are designated with the same reference numerals.

First Embodiment

A first embodiment is described below. In this embodiment, a collecting filter and a method for manufacturing a transparent conducting film using the colleting filter will be described. The transparent conducting film has a CNTs pattern and can be applied to a heater. The collecting filter is suitable for manufacturing the transparent conducting film having the CNTs pattern.

Figure 1B:
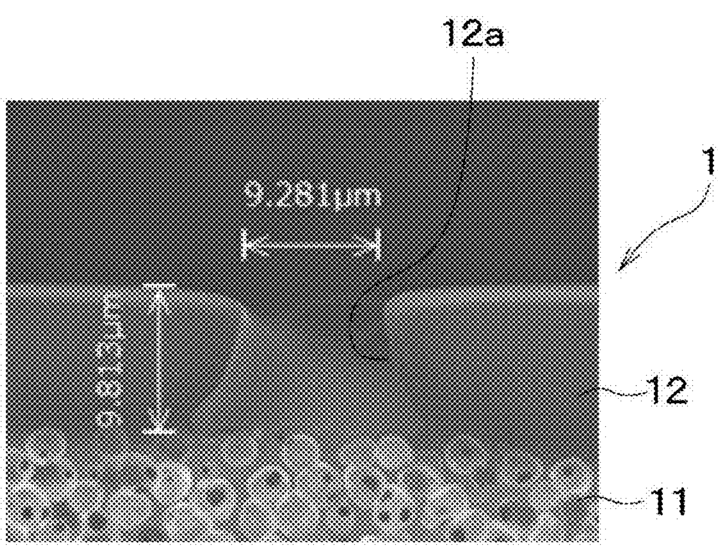
FIG. 1B is a scanning electron microscope (SEM) image diagram of the collecting filter according to the first embodiment.

As shown in FIGS. 1A and 1B, the collecting filter 1 includes a patterned dense film 12 on a filter membrane 11.

The filter membrane 11 is made of a material with a porous structure that can filter CNTs from a dispersion medium such as an aerosol containing CNTs to be a gas phase dispersion medium or a colloidal solution to be a liquid phase dispersion medium. The filter membrane 11 has an air permeability, for example, a time required for permeation of a defined volume of air is 20 seconds or less, per unit area and unit pressure difference. If the air permeability is high, the internal pressure of the chamber will become high when manufacturing a transparent conducting film having a CNTs pattern, so it is preferable that the air permeability is 20 seconds or less so that the internal pressure can be suppressed to a certain level. For example, polyimide or the like can be used as the filter membrane 11. Although the filter membrane 11 can be made of materials other than polyimide, it is preferable to make the filter membrane 11 of polyimide in consideration of workability when patterning the dense film 12, which will be described later. Specifically, in photolithography to pattern the dense film 12, if too much light is reflected on the filter membrane 11, areas other than the desired positions will be exposed, resulting in poor processability. When using the polyimide, the reflection can be restricted, and an accurate exposure becomes possible. This makes it possible to form the dense film 12 in a highly accurate pattern. The thickness of the filter membrane 11 is set to collect CNTs and obtain the above-mentioned air permeability. When the filter membrane 11 is made of polyimide, the thickness is set to, for example, 20 to 200 μm. When a dispersion medium containing CNTs is passed through the filter membrane 11, the CNTs are filtered by the filter membrane 11, and the CNTs can remain on the surface of the filter membrane 11.

The dense film 12 has the opening 12*a* of a desired pattern. The dense film 12 is made of a dense material that blocks the passage of dispersion medium containing CNTs used for manufacturing a CNTs pattern in a portion different from the opening 12*a*, for example, a dry film resist or a metal thin film. The opening 12*a* is formed by photo-etching the dense film 12, and has a shape corresponding to the shape of the CNTs pattern desired to be manufactured. For example, the CNTs pattern can be formed into a stripe shape in which plural straight lines are arranged in parallel at equal intervals. The width of the opening 12*a*, that is, the dimension in a direction perpendicular to the longitudinal direction of each line of the CNTs pattern on the plane of the dense film 12, is set narrower at the first width Wa on the inlet side opposite to the filter membrane 11 than at the second width Wb on the bottom side adjacent to the filter membrane 11. Therefore, in a cross-section along the width direction as shown in FIGS. 1A and 1B, the opening 12*a* has a reverse tapered shape that gradually widens from the inlet side toward the bottom side.

Specifically, the first width Wa and the second width Wb satisfy a relationship that the ratio of the second width Wb to the first width Wa is greater than 1 and less than 2.

The reason why the upper limit value is set for the ratio of the second width Wb to the first width Wa is described. If the amount of protrusion of the dense film 12 inward of the opening 12*a* on the side opposite to the filter membrane 11 increases, the opening 12*a* collapses at the inlet side and the first width Wa changes. In case where the collecting filter 1 is used repeatedly, if the inlet side of the opening 12*a* is crushed, it is impossible to form the CNTs pattern into a desired pattern with high accuracy. Therefore, the ratio of the second width Wb to the first width Wa is made smaller than 2. However, the upper limit value of the ratio of the second width Wb to the first width Wa depends on the required accuracy of the CNTs pattern and also on the durability of the dense film 12, so it is not necessarily limited to less than 2.

The upper limit value of the first width Wa is arbitrary, but the effect of forming the opening 12*a* into a reverse tapered shape will be reduced if the upper limit value is too large. It is preferable to set the upper limit value to 50 μm or less, or preferably 10 μm or less, which can realize a high transmittance by the CNTs pattern. Furthermore, the lower limit value of the first width Wa is arbitrary, but depends on the manufacturing limit of the opening 12*a*. The manufacturing limit of the opening 12*a* is determined by the material of the dense film 12. For example, if the dense film 12 is made of a dry film, the first width Wa can be about 5 μm. Depending on the material of the dense film 12, the first width Wa may be about 2 μm.

Although the first width Wa on the inlet side and the second width Wb on the bottom side of the opening 12*a* have been described, when the first width Wa is smaller than the second width Wb, the opening 12*a* can be said to have a reverse tapered shape. The shape of the side wall of the opening 12*a* is not limited. For example, the side wall of the opening 12*a* may be shaped as a flat surface from the inlet side to the bottom side, and the width of the opening 12*a* may change at a constant rate in the thickness direction of the dense film 12. Further, the side wall of the opening 12*a* may be shaped as a curved surface from the inlet side to the bottom side, and an increase rate in the width of the opening 12*a* may gradually increase or decrease as extending from the inlet side to the bottom side. Alternatively, the side wall of the opening 12*a* may have an uneven surface from the inlet side to the bottom side, and may have a shape in which random unevenness is formed from the inlet side to the bottom side.

The thickness of the dense film 12 is also arbitrary. However, in order to lower the resistance of CNTs pattern low, it is desirable to form a thick film. The lower limit value of the film thickness of the dense film 12 is, for example, 5 μm. It is more preferable that the dense film 12 has a thickness of 10 μm or less. The upper limit value of the film thickness of the dense film 12 is preferably set to 50 μm or less in consideration of processing accuracy by photo-etching when forming the opening 12*a* in the dense film 12.

Further, the thickness of the dense film 12 determines the aspect ratio of the opening 12*a*, that is, the ratio of the depth D to the first width Wa on the inlet side of the opening 12*a*. In order to form a thick CNTs film, in case where the aspect ratio of the opening 12*a* is set to 0.1 or more, if the opening 12*a* has a forward tapered shape, the internal pressure of the chamber in which collection is performed tends to fluctuate, and the CNTs synthesis conditions tend to change. As a result, the quality of the CNTs becomes unstable and varies, making it impossible to achieve low resistance. The reason will be explained later, but even in the case of such a high aspect ratio, the fluctuations in the internal pressure of the chamber can be suppressed by making the opening 12*a* have the reverse tapered shape. This makes it possible to suppress changes in CNTs synthesis conditions. Therefore, the quality of CNTs can be stabilized even with a high aspect ratio, and low resistance can be achieved.

Next, a method for manufacturing a transparent conducting film having the CNTs pattern using the collecting filter 1 will be described with reference to FIGS. 2A to 2E and FIGS. 3A to 3E, which includes a method for manufacturing the collecting filter 1 of this embodiment.

Figure 2A:
FIG. 2A is a cross-sectional view showing a manufacturing process of a collecting filter.
Figure 2B:
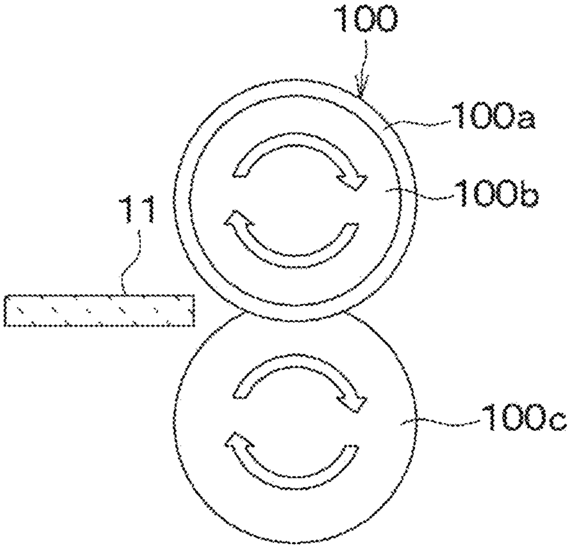
FIG. 2B is a cross-sectional view showing a manufacturing process of the collecting filter, following FIG. 2A.
Figure 2C:
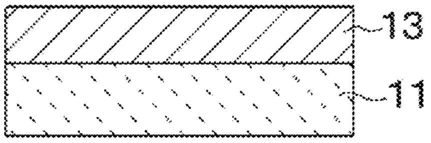
FIG. 2C is a cross-sectional view showing a manufacturing process of the collecting filter, following FIG. 2B.

First, as shown in FIG. 2A, a filter membrane 11 is prepared. The filter membrane 11 is made of polyimide or the like, as described above. Subsequently, as shown in FIG. 2B, a roll coater 100 is prepared, which has an application roller 100*b* on which a film-like resist material 100*a* is disposed and a conveyance roller 100*c*. Then, the filter membrane 11 is passed through the roll coater 100. As a result, the dry film resist 13 is applied to one side of the filter membrane 11, as shown in FIG. 2C. Although the coating thickness of the dry film resist 13 is arbitrary, it is preferably 10 μm or more as described above.

Figure 2D:
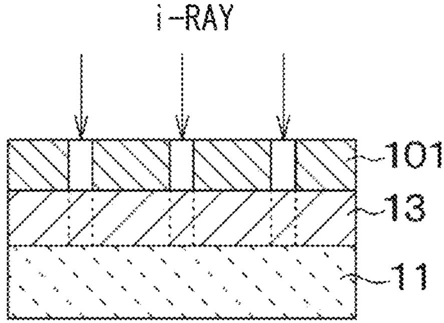
FIG. 2D is a cross-sectional view showing a manufacturing process of the collecting filter, following FIG. 2C.
Figure 2E:
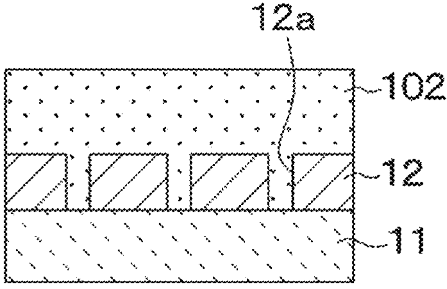
FIG. 2E is a cross-sectional view showing a manufacturing process of the collecting filter, following FIG. 2D.

Next, as shown in FIGS. 2D and 2E, a photolithograph/etching process is performed to pattern the dry film resist 13 to form the openings 12*a*, thereby obtaining the dense film 12. Specifically, as shown in FIG. 2D, an exposure mask 101 such as a metal mask is prepared. The exposure mask 101 is placed on the dry film resist 13, and i-ray irradiation is performed. The dry film resist 13 is exposed at the position where the opening 12*a* is to be formed. Then, as shown in FIG. 2E, the exposed portions are removed by etching using the etchant 102, thereby obtaining the dense film 12 in which the openings 12*a* are formed.

At this time, the opening 12*a* is made to have a reverse tapered shape based on the exposure conditions and development conditions. For example, the exposure condition is set to 70 $mJ/cm^2$ to increase the exposure amount, or the development time is increased to 1 minute. Further, since the diffuse reflection condition of the filter membrane 11 is a factor that determines the shape of the opening 12*a*, the diffuse reflection condition of the filter membrane 11 is also selected such that the opening 12*a* has a reverse tapered shape. As described above, when the filter membrane 11 is made of polyimide, the diffuse reflection condition can also be made favorable. In this way, the opening 12*a* can be formed into a reverse tapered shape.

Although FIGS. 2D and 2E use a positive type in which the exposed portion is removed as an example, a negative type in which the exposed portion remains may be used. In that case, the position where the opening 12*a* is to be formed is masked, and the other parts are exposed. Furthermore, although the dense film 12 is made of the dry film resist 13, if the dense film 12 is made of a metal thin film, the opening 12*a* can be formed into a reverse tapered shape by setting the exposure conditions and the development time for the metal thin film. For example, when forming a metal thin film in a reverse tapered shape, the exposure condition may be 70 $mJ/cm^2$ and the development time may be 2 minutes. In other words, the development time is longer than in the case of a forward tapered shape.

In this way, the collecting filter 1 in which the dense film 12 is arranged on one side of the filter membrane 11 can be manufactured.

Figure 3A:
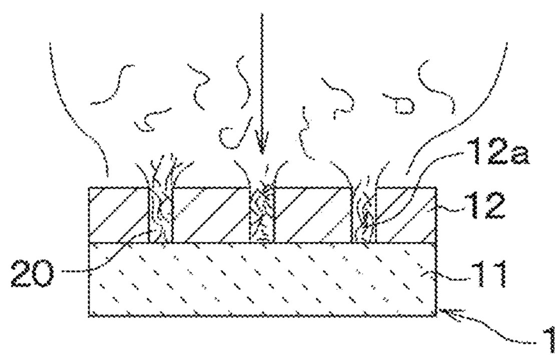
FIG. 3A is a cross-sectional view showing a manufacturing process of a transparent conducting film using a collecting filter.

Thereafter, the collecting filter 1 is installed in a chamber (not shown) in which CNTs can be supplied. This chamber can supply a dispersion medium such as an aerosol, which is a gas-phase dispersion medium containing CNTs, or a colloidal solution, which is a liquid-phase dispersion medium, and the CNTs can be collected by passing the dispersion medium through the collecting filter 1. Specifically, the chamber is equipped with an installation stand provided with a passageway corresponding to the collecting filter 1. On this installation stand, the collecting filter 1 is arranged so that the dense film 12 of the collecting filter 1 is oriented toward the upstream side of the dispersion medium in the supply path, and the filter membrane 11 is oriented toward the downstream side of the dispersion medium in the supply path. When the collecting filter 1 is placed on the installation stand, the upstream space and the downstream space of the dispersion medium in the supply path are partitioned by the collecting filter 1, and the dispersion medium containing CNTs passes through the opening 12*a* of the collecting filter 1. Therefore, when the dispersion medium containing the CNTs is supplied into the chamber with the collecting filter 1 installed, the CNTs 20 are collected within the openings 12*a*, as shown in FIG. 3A.

The collection may be terminated when the CNTs 20 are collected until the inside of the opening 12*a* is filled, but if the collection is continued further, the CNTs 20 will be collected so as to protrude outward of the opening 12*a*, and the T-shaped CNTs pattern can be formed.

Figure 3B:
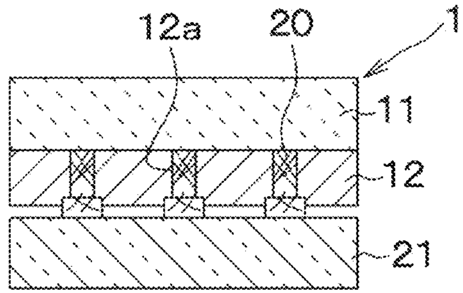
FIG. 3B is a cross-sectional view showing a manufacturing process of the transparent conducting film, following FIG. 3A.
Figure 3C:
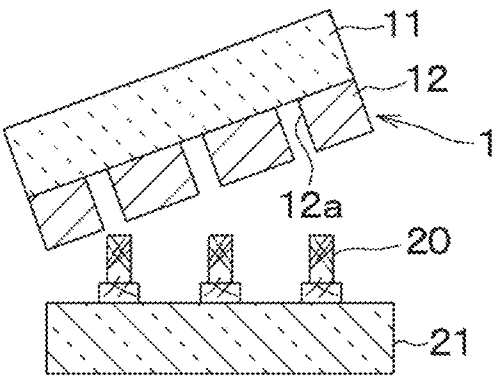
FIG. 3C is a cross-sectional view showing a manufacturing process of the transparent conducting film, following FIG. 3B.

Subsequently, the collecting filter 1 on which the CNTs 20 have been collected is taken out from the chamber. As shown in FIG. 3B, the collecting filter 1 is placed onto one surface of the transparent base material 21, such that the dense film 12 on which the CNTs 20 are arranged opposes the one surface of the transparent base material 21. The transparent base material 21 is preferably a flexible material such as a transparent plastic film, which allows light to pass through and is visible to the side opposite to the transparent base material 21. By arranging the collecting filter 1 on which the CNTs 20 are collected on the one surface of the transparent base material 21 in this way, one end of the CNTs 20 is brought into contact with the transparent base material 21. When the collecting filter 1 is lifted in this state, as shown in FIG. 3C, the collecting filter 1 is removed and the CNTs 20 are transferred to the transparent base material 21. As a result, for example, the portion protruding outward of the collecting filter 1 becomes wider than the portion disposed within the opening 12*a*, and the cross section of the CNTs 20 becomes an inverted T-shape.

Figure 3D:
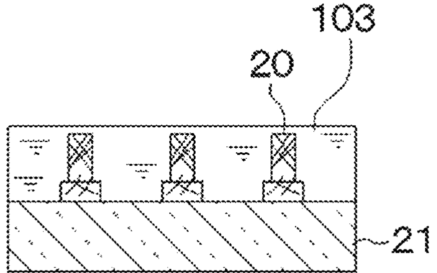
FIG. 3D is a cross-sectional view showing a manufacturing process of the transparent conducting film, following FIG. 3C.
Figure 3E:
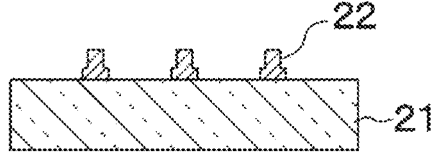
FIG. 3E is a cross-sectional view showing a manufacturing process of the transparent conducting film, following FIG. 3D.

After that, as shown in FIG. 3D, the transparent base material 21 onto which the CNTs 20 have been transferred is immersed in the doping solution 103. Then, the CNTs pattern 22 is formed, as shown in FIG. 3E, and the height of the CNTs 20 is reduced, for example, to about 1/10 such as 1.0 to 5.0 μm. In this way, a transparent conducting film can be manufactured, in which the CNTs pattern 22 is arranged on the one surface of the transparent base material 21.

Here, in this embodiment, the opening 12*a* has a reverse tapered shape. Therefore, when collecting the CNTs 20 in the opening 12*a* shown in FIG. 3A, the variation in the internal pressure of the chamber can be reduced. Since the CNTs synthesis conditions can be made stable, the quality of the CNTs 20, that is the quality of the CNTs pattern 22 can be stabilized. The reason for this will be explained in comparison with a case where the opening 12*a* has a forward tapered shape.

Figure 4A:
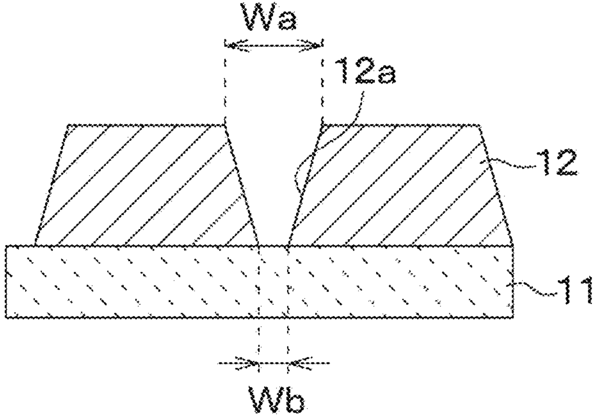
FIG. 4A is a cross-sectional view showing a collection of CNTs when an opening of a dense film has a forward tapered shape.
Figure 4B:
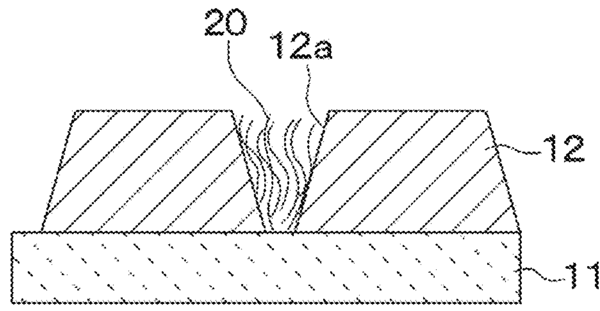
FIG. 4B is a cross-sectional view showing a collection of CNTs, following FIG. 4A.

As shown in FIG. 4A, when the opening 12*a* has a forward tapered shape in which the first width Wa on the inlet side is larger than the second width Wb on the bottom side, the CNTs 20 are collected as shown in FIG. 4B. That is, the CNTs 20 are collected along the sidewall of the opening 12*a*, and the CNTs 20 are in close contact with the sidewall, so that the contact area between the dense film 12 and the CNTs 20 becomes large. Since the CNTs 20 and the dense film 12 are in close contact with each other, there is almost no gap between the CNTs 20 and the dense film 12, and the amount of dispersion medium passing through is limited, resulting in a high pressure loss in the collecting filter 1. As a result, since the internal pressure of the chamber fluctuates, the CNTs synthesis conditions change. Then, since the quality of the CNTs 20 becomes unstable and varies, it is difficult to lower the resistance of the CNTs pattern 22.

Figure 5A:
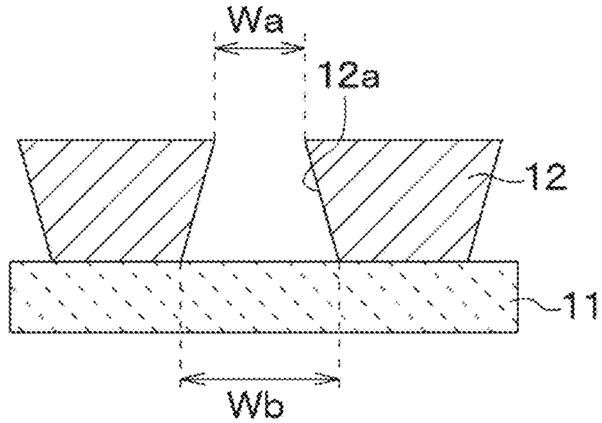
FIG. 5A is a diagram showing a collection of CNTs when an opening of a dense film has a reverse tapered shape.
Figure 5B:
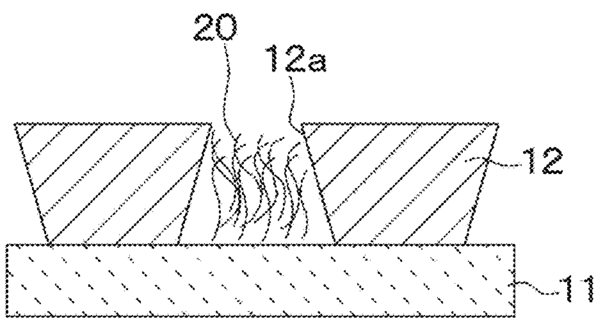
FIG. 5B is a cross-sectional view showing a collection of CNTs, following FIG. 5A.

In contrast, as shown in FIG. 5A, when the opening 12*a* has a reverse tapered shape in which the first width Wa on the inlet side is smaller than the second width Wb on the bottom side, the CNTs 20 are collected as shown in FIG. 5B. That is, the CNTs 20 are collected with a gap between the side wall of the opening 12*a* and the CNTs 20, and the CNTs 20 are not in close contact with the side wall, so that the contact area between the dense film 12 and the CNTs 20 is reduced. Therefore, even during the collection of the CNTs 20, the dispersion medium can pass through the gap between the CNTs 20 and the dense film 12, and the pressure loss of the collecting filter 1 is suppressed from increasing. Therefore, fluctuations in the internal pressure of the chamber can be suppressed and the CNTs synthesis conditions can be stabilized, making it possible to stabilize the quality and lower the resistance of the CNTs pattern 22.

Furthermore, as shown in FIG. 30, when the CNTs 20 are transferred to the transparent base material 21, if the opening 12*a* has the reverse tapered shape, since the contact area between the side wall of the opening 12*a* and the CNTs 20 is small, the CNTs 20 easily peel off from the dense film 12. Therefore, it is possible to easily transfer the CNTs 20, and it is also possible to suppress defects in the CNTs pattern 22 due to the CNTs 20 which cannot be peeled off from the dense film 12.

Figures 6, 7:
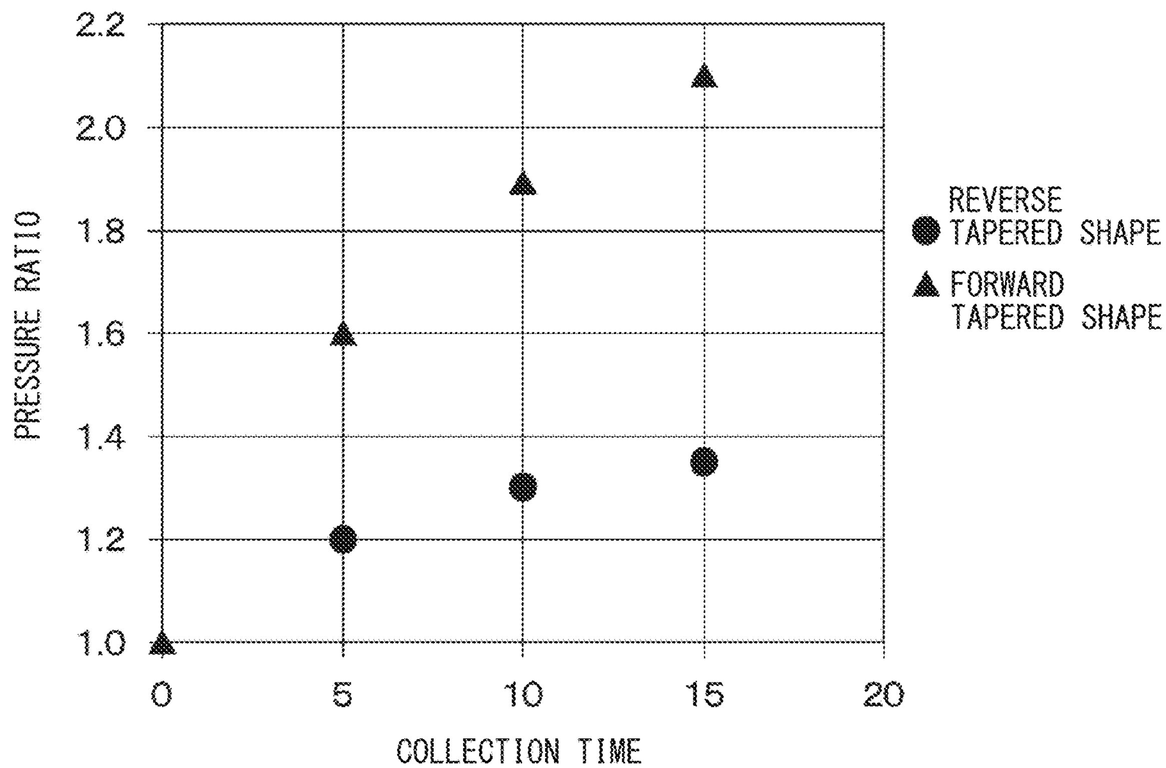
FIG. 6 is a diagram showing a relationship between a CNTs collection time and a pressure ratio when an opening of a dense film has a reverse tapered shape or a forward tapered shape.
FIG. 7 is a diagram showing results of measuring a sheet resistance of CNTs patterns when an opening of a dense film has a reverse tapered shape or a forward tapered shape.

Regarding the above effects, the relationship between the collection time of the CNTs 20 and the pressure ratio of the internal pressure of the chamber, and the sheet resistance [Ω/□] of the transparent conducting film were investigated for each of the case where the opening 12*a* has a forward tapered shape and the case where the opening 12*a* has a reverse tapered shape. FIG. 6 and FIG. 7 are diagrams showing the results. The pressure ratio of the internal pressure of the chamber means a ratio of the pressure in the upstream space of the collecting filter 1, relative to the pressure in the downstream space of the collecting filter 1.

As shown in FIG. 6, in the case of the forward tapered shape, the pressure ratio increases as the collection time increases. Specifically, when the collection time was 15 minutes, the pressure ratio increased by 2.1 times. On the other hand, in the case of the reverse tapered shape, although the pressure ratio increased even if the collection time became longer, the pressure ratio did not change much, and could be kept at about 1/3 of that in the case of the forward tapered shape. Specifically, when the collection time was 15 minutes, the pressure ratio was restricted within the increase of 1.35 times. This also shows that fluctuations in the internal pressure of the chamber can be suppressed by forming the opening 12*a* into the reverse tapered shape.

Furthermore, as shown in FIG. 7, the sheet resistance [Ω/□] was 150 [Ω/□] when the opening 12*a* has a forward tapered shape. When the opening 12*a* has a reverse tapered shape, the sheet resistance [Ω/□] was 120 [Ω/□]. From this, it can be seen that when the opening 12*a* is formed into a reverse tapered shape, the quality of the CNTs 20 is stabilized and low resistance can be achieved.

As explained above, in the present embodiment, the opening 12*a* is formed in the reverse tapered shape, in the collecting filter 1 that includes the dense film 12 on one surface of the filter membrane 11. The dense film 12 has the openings 12*a* corresponding to the CNTs pattern 22 to be formed. By using the collecting filter 1, it is possible to suppress fluctuations in the internal pressure of the chamber in which the CNTs 20 are collected, and it is possible to suppress changes in the CNTs synthesis conditions. Therefore, the quality of the CNTs 20 can be stabilized even at a high aspect ratio, and the resistance of the CNTs pattern 22 can be made low.

Further, the transparent conducting film having the CNTs pattern 22 formed as in this embodiment can be used, for example, as a heater. Examples of the heater include a heater used when performing defrosting operation in a vehicle air conditioner. In that case, by attaching a transparent conducting film to an outdoor unit or the like where frost adheres, it can be made to function as a heater. In addition, it can also be applied to a heater for defrosting and preventing condensation to maintain the function of sensor for peripheral monitoring in vehicle such as LiDAR (Light Detection and Ranging), camera, and millimeter wave radar, and a front windshield. Specifically, the transparent conducting film plays a role as a heater to warm up the sensor and the front windshield, when icing or fogging occurs, by removing the icing or fogging, and ensure the sensor function.

Furthermore, the transparent conducting film can also be applied to heaters placed in various locations in the cabin of a vehicle, such as a foot heater placed on the bottom surface of a dashboard. When used in such a heater, it is desired that the CNTs pattern 22 and the transparent base material 21 have a high light transmittance as a whole because the CNTs pattern 22 is made inconspicuous. The light transmittance is determined by the width and density of the lines constituting the CNTs pattern 22 and the material and thickness of the transparent base material 21. The CNTs pattern 22 and the transparent base material 21 are not visible when the width of each line of the CNTs pattern 22 is set to 10 μm or less.

Furthermore, by using the dry film resist 13 as the dense film 12, the dense film 12 can be formed through a simple process that does not require spin coating or baking, compared to a case where it is formed by conventional coating. In addition, as for the dry film resist 13, a roll-shaped one shown in FIG. 2B can be used, and a roll-to-roll method can be used in which the dry film resist 13 is wound up into a roll again after coating, thereby achieving high mass productivity.

Other Embodiments

Although the present disclosure is made with reference to the embodiment described above, the present disclosure is not limited to such embodiment but may include various changes and modifications which are within equivalent ranges. In addition, various combinations and modes, and other combinations and modes including only one element, more elements, or less elements are also within the scope and idea of the present disclosure.

For example, in the above embodiment, the cross-sectional shape of each line constituting the CNTs pattern 22 is an inverted T-shape as shown in FIG. 2E, but other shapes may be used. That is, it is sufficient that the cross-sectional shape includes a line-shaped part whose height direction is the normal direction to one surface of the transparent base material 21. There may or may not be a portion extending from each line-shaped part like an inverted T-shape along one surface of the transparent base material 21. Further, the portion extending from each line-shaped part along one surface of the transparent base material 21 may be formed thinner than the line-shaped part over the entire area adjacent to the line-shaped part. In such a structure, the CNTs are formed on one surface of the transparent base material 21 to be a base. However, the transparent conducting film can have a desired light transmittance while being covered with the thinner CNTs, since the thinner the CNTs film is, the higher the light transmittance is.

Furthermore, in the embodiment, a line-and-space structure is formed by arranging the straight lines in a stripe shape. However, this is just an example of a line-and-space structure. That is, any structure may be used while a portion where the CNTs line is arranged and a portion where the CNTs line is not arranged are alternately arranged, on a cross-section of the CNTs pattern 22 taken along one direction on one surface of the transparent base material 21. For example, the CNTs pattern 22 may be configured in a quadrangular lattice shape in which linear lines are orthogonal to each other, a honeycomb shape in which hexagonal shapes are arranged, or the like.

Further, in the embodiment, the transparent base material 21 is used to manufacture a transparent conducting film, but the collecting filter 1 can be applied not only to the manufacture of a transparent conducting film but also to the manufacture of a conducting film including the CNTs pattern 22. In that case, a non-transparent base material may be used instead of the transparent base material 21.

Further, in the embodiment, the CNTs are used as the nanocarbon material, but nanocarbon materials such as carbon nanobelts (CNB), graphene, and fullerene may also be used. In other words, although the CNTs pattern 22 is shown as a pattern made of nanocarbon material, the pattern may be made of other nanocarbon materials.

What is claimed is:

1. A collecting filter comprising:

a filter membrane having a porous structure to filter a nanocarbon material from a dispersion medium containing the nanocarbon material, the filter membrane having one surface; and a dense film formed on the one surface and having an opening through which the dispersion medium passes, the dense film having a denseness to block passage of the dispersion medium in a portion different from the opening, wherein the opening has a first width at an inlet of the dispersion medium opposite to the filter membrane and a second width at a bottom side adjacent to the filter membrane, and the first width is smaller than the second width.

2. The collecting filter according to claim 1, wherein the opening has an aspect ratio which is a ratio of a depth of the opening to the first width, and the aspect ratio is more than or equal to 0.1.

3. The collecting filter according to claim 1, wherein the first width is 50 μm or less.

4. The collecting filter according to claim 1, wherein the dense film has a thickness within a range of 10 μm or more and 50 μm or less.

5. The collecting filter according to claim 1, wherein a ratio of the second width to the first width is greater than 1 and less than 2.

6. A method of manufacturing a transparent conducting film including a pattern made of a nanocarbon material using the collecting filter according to claim 1, the method comprising:

arranging the collecting filter in a chamber where the dispersion medium containing the nanocarbon material is supplied, such that the dense film is oriented toward an upstream side of the dispersion medium in a supply path and the filter membrane is oriented toward a downstream side of the dispersion medium in the supply path;

collecting the nanocarbon material within the opening by supplying the dispersion medium into the chamber and causing the dispersion medium to pass through the collecting filter;

after collecting the nanocarbon material, placing a transparent base material on the dense film of the collecting filter; and removing the collecting filter from the transparent base material to transfer the nanocarbon material to the transparent base material so as to form the pattern using the nanocarbon material.

* * * * *